United States Patent
Sorensen, Jr.

(10) Patent No.: US 7,517,379 B2
(45) Date of Patent: Apr. 14, 2009

(54) HONEYCOMB FILTERS WITH REDUCED NUMBER OF UNPLUGGED PARTIAL PERIPHERAL CELLS AND METHODS OF MANUFACTURING SAME

(75) Inventor: Charles Mitchel Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 523 days.

(21) Appl. No.: 11/303,533

(22) Filed: Dec. 16, 2005

(65) Prior Publication Data

US 2007/0137158 A1    Jun. 21, 2007

(51) Int. Cl.
*B01D 46/00* (2006.01)
*F01N 3/022* (2006.01)

(52) U.S. Cl. .................. 55/523; 55/282.3; 55/385.3; 55/524; 55/DIG. 5; 55/DIG. 10; 55/DIG. 30; 60/311; 95/273; 428/116; 264/628; 264/630; 264/DIG. 48

(58) Field of Classification Search ............... 55/282.2, 55/282.3, 385.3, 523, 524, DIG. 5, DIG. 10, 55/DIG. 30; 95/273, 278; 60/311; 428/116, 428/117, 118; 264/628, 630, 631, DIG. 48
See application file for complete search history.

(56) References Cited

U.S. PATENT DOCUMENTS

| 4,335,023 | A | * | 6/1982 | Dettling et al. ............. 422/180 |
| 4,364,761 | A | * | 12/1982 | Berg et al. .................... 55/523 |
| 5,183,608 | A | * | 2/1993 | Guile .................. 264/DIG. 48 |
| 5,853,459 | A | * | 12/1998 | Kuwamoto et al. ........... 95/273 |
| 6,159,431 | A | * | 12/2000 | Inoue et al. .................. 422/180 |
| 6,803,087 | B2 | * | 10/2004 | Brew et al. .................... 55/523 |
| 6,827,754 | B2 | * | 12/2004 | Suwabe et al. ................ 55/523 |
| 7,329,300 | B2 | * | 2/2008 | Ichikawa ..................... 55/523 |
| 7,393,377 | B2 | * | 7/2008 | Kasai et al. ................... 55/523 |
| 2004/0053005 | A1 | | 3/2004 | Hamanaka et al. .......... 428/116 |
| 2005/0016141 | A1 | * | 1/2005 | Hong et al. .................... 55/523 |
| 2005/0166562 | A1 | * | 8/2005 | Beall et al. .................... 55/523 |
| 2006/0029769 | A1 | | 2/2006 | Ichikawa et al. ............ 428/116 |

* cited by examiner

*Primary Examiner*—Jason M Greene
(74) *Attorney, Agent, or Firm*—Matthew B. McNutt

(57) ABSTRACT

A method of blocking partial cells at the periphery of diesel filters is disclosed. The method comprises plugging the partial cells with a suitable plugging material. In one embodiment, a line of plugging material is applied to either or both of the end faces of the diesel filter along an outermost row of partial cells to block same. In another embodiment, the outermost wall the diesel filter is first beveled to form a beveled edge and uniquely off-set the partial cells. Then the beveled edge has applied thereto a plugging material, such as a line or bead. A honeycomb structure having reduced number of unplugged partial cells at the periphery is also disclosed.

18 Claims, 6 Drawing Sheets

HONEYCOMB FILTERS WITH REDUCED NUMBER OF UNPLUGGED PARTIAL PERIPHERAL CELLS AND METHODS OF MANUFACTURING SAME

TECHNICAL FIELD

The present invention relates to honeycomb filter articles and methods of manufacturing the same. More particularly, the present invention relates to methods of plugging cells of honeycomb filters and honeycomb filters manufactured thereby.

BACKGROUND OF THE INVENTION

Diesel engines provide lower emissions and increased fuel economy compared to gasoline engines; however, if untreated diesel exhaust emissions are generally undesirable. Diesel particulate filters have been employed to control/treat particulate emissions from diesel-powered equipment such as trucks, buses, diesel electric locomotives and generators. Diesel particulate filters control diesel particulate emissions by physically trapping soot particles in their structure.

A typical diesel particulate filter body may be fabricated using, for example, a honeycomb structure having a matrix of intersecting thin, porous walls that extend across and between its two opposing open end faces and form a large number of adjoining hollow passages, or cells, which also extend between and are open at the end faces. To form a filter, one end of each of the cells is closed, preferably a first subset of cells being closed at one end face, and the remaining cells at the remaining end face. A contaminated fluid is brought under pressure to one face (the "inlet face") and enters the filter body via the cells that are open at the inlet face (the "inlet cells"). Because the inlet cells are sealed at the remaining end face (the "outlet face") of the body, the contaminated fluid is forced through the thin, porous walls into adjoining cells that are sealed at the inlet face and open at the opposing outlet face of the filter body (the "outlet cells"). The solid particulate contaminant in the fluid (such as soot), which is too large to pass through the porous openings in the walls, is left behind and a cleansed fluid exits the outlet face of the filter body through the outlet cells.

Such diesel filters are typically formed by an extrude-to-shape process, with many possible peripheral shapes or contours, for example, round, oval, and the like. However, when such shapes are employed, a problem arises in that it is nearly always the case that an integral number of complete cells do not fit into the cross-sectional area of the diesel filter. Thus, partial cells occur at the outer periphery of the diesel filter. These partial cells are located at the outermost periphery of the filter and, generally, the cell dimensions of these partial cells are smaller than the design value. Moreover, such cells generally are grouped in a line at various locations around the filter's periphery. Generally, automated plugging equipment used to plug alternating cells in diesel filters have difficulty in finding and plugging these peripheral partial cells, so that unplugged partial cells at the periphery may exist. Because these partial cells are unplugged, in operation unfiltered exhaust gas containing both particulate matter and $NO_x$ emissions may flow through them freely. Accordingly, a method of plugging these partial cells at the periphery of diesel filters is desired. Likewise, honeycomb filters, such as diesel filters, with a reduced number of unplugged partial cells around their periphery are much sought after.

SUMMARY OF THE INVENTION

According to a first aspect of the present invention, a method is provided for blocking partial cells located at the periphery of filters, such as diesel filters. Specifically, a method of manufacturing a honeycomb structure is provided, comprising providing a honeycomb body having a multiplicity of cells extending therethrough between opposing end faces, said cells being defined by intersecting porous walls, and are bounded by an outer wall extending between said end faces, wherein said cells include a row of partial cells adjacent to said outer wall, and applying to said partial cells a line of plugging material to block said row of partial cells.

Advantageously, the present invention blocks the partial cells by adding a line of a plugging material to the outermost row of cells of the diesel filter. Thus, desirably, the partial cells of the honeycomb article are blocked in operation to prevent the flow of exhaust gasses therethrough.

Because the number of partial cells are few and because these partial cells are smaller than the main cells, the partial cells do not need to have the alternate plug pattern. Completely plugging all of the partial cells and blocking all flow through them is acceptable. The plug line may be added to either, or both, of the end faces of the diesel filter. In one embodiment, the plug line is applied to the outlet end of the filter only. In another embodiment, the plug line comprises a bead of a suitable plugging material which is applied to either or both of the end faces of the diesel filter. The line of plugging material preferably has a width sufficient to block the partial cells at the periphery. This generally means that the width is at least as large as the radial width of the largest partial cell.

In another embodiment, the outer edge atop the partial cells of the diesel filter is first beveled with a cutting or grinding tool to form a beveled edge and uniquely off-set the partial cells. The beveled edge then has a suitable plugging material applied thereto, preferably in the form of a line of plugging material. The line may comprise a bead, and optionally, the profile of the line may be altered after applying the plugging material, such as with a doctor blade or other profile altering implement.

An additional advantage of the present invention is that the diesel filter is strengthened and is, therefore, more resistant to edge chipping. A more chip-resistant edge will reduce handing losses in the supply chain, as well as in the manufacturing plants.

According to further embodiment of the invention, a honeycomb filter is provided comprising a honeycomb body having a multiplicity of cells extending therethrough formed from intersecting walls and an outer wall bounding said cells wherein the cells located adjacent to the outer wall comprise partial cells, and a line of plugging material blocking the partial cells.

According to yet further embodiments of the invention, a honeycomb filter is provided comprising a honeycomb body having a multiplicity of cells formed of intersecting walls and an outer wall bounding the multiplicity of cells wherein the cells located adjacent to the outer wall comprise a row of partial cells, a bevel formed atop the row of partial cells, and plugging material applied to the bevel to block the partial cells. According to further embodiments of the invention, the plugging material is in the form of a line of plugging -material. The outer profile of the applied line of plugging material, which may be altered to form a desired profile.

These, as well as other aspects and advantages of the present invention, will become more apparent after careful consideration is given to the following detailed description of the preferred exemplary embodiments thereof in conjunction with the accompanying drawings.

DETAILED DESCRIPTION AND PREFERRED EMBODIMENTS OF THE INVENTION

Typically, a solid particulate filter body is fabricated from a honeycomb structure having a multiplicity of mutually adjoining cells extending therethrough, which are arranged in generally parallel rows and generally parallel columns between a pair of opposing end faces, being formed by thin intersecting porous walls extending across and between the end faces with an outer wall extending between the end faces and bounding the rows of cells. The ends of a subset of alternative cells at one end face of the structure are closed in some manner. Preferably also, the ends of the remaining cells at the remaining end face of the structure are also closed in some manner. For example, the closing of the cells may be accomplished by charging a flowable cement plugging material into selected cells of the honeycomb structure by covering one end face of the honeycomb structure with a mask formed from a solid, either resilient or rigid, material having a number of openings extending through it that are located to coincide with the open ends of selected cells on the end face. The flowable material passes through the mask openings and into the selected cells to be plugged. The process is then repeated with the opposing end face of the structure, if plugged. Because of the checkered sealing pattern selected and the cellular arrangement provided in the honeycomb structure, the same plate may be used. The structure is inverted and its remaining end face positioned against the plate with the bores of the plate aligned opposite the ends of the remaining (as yet unfilled) alternate cells. After filling the alternate cells at the second end face, the structure is fired to sinter the cement to the thin walls at an end of each of the cells.

Honeycomb structures for solid particulate filtering and other applications may be formed from a variety of porous materials including ceramics, glass-ceramics, glasses, metals, cements, resins or organic polymers, papers, or textile fabrics (with or without fillers, etc.), and various combinations thereof and by variety of methods depending upon the material(s) selected. Honeycomb structures having uniformly thin, porous and interconnected walls for solid particulate filtering applications are preferably fabricated from plastically formable and sinterable substances that yield a porous, sintered material after being fired to affect their sintering, especially metallic powders, ceramics, glass-ceramics, cermets, and other ceramic-bases mixtures. According to certain embodiments, the structure may be formed from a porous ceramic material, such as silicon carbide, cordierite or aluminum titanate.

Figure 1:
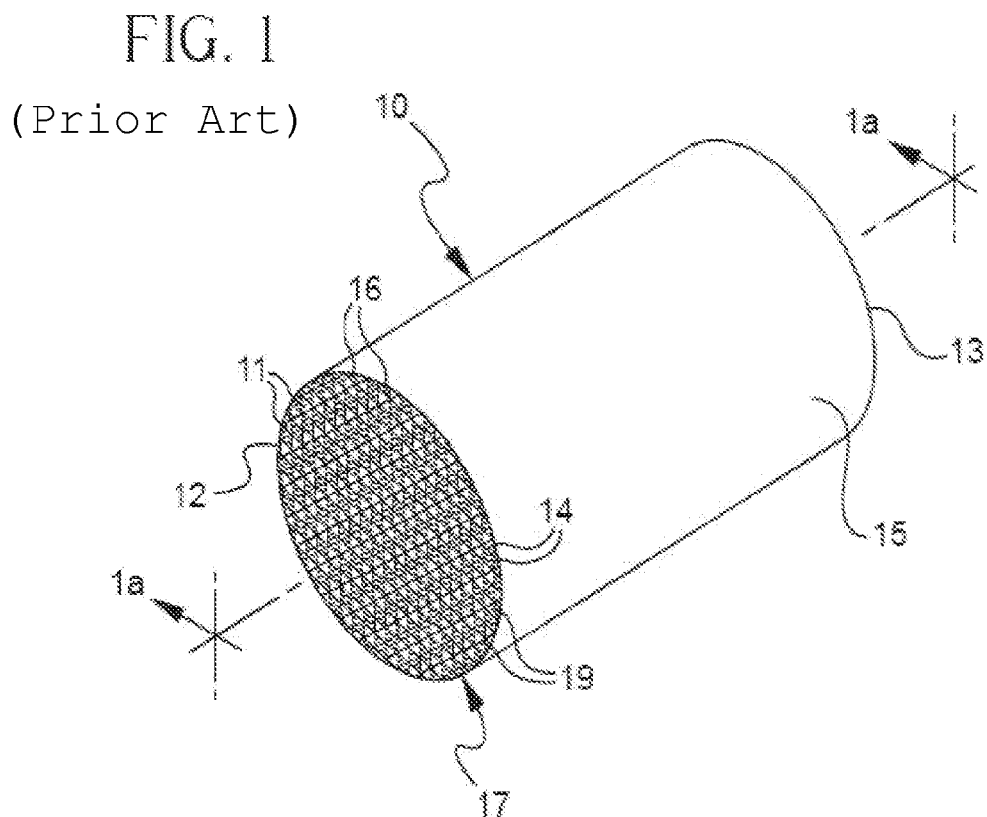
FIGS. 1 and 1a depict perspective and cross-sectioned views of a typical solid particulate filter body fabricated using conventional methods.
Figure 1A:
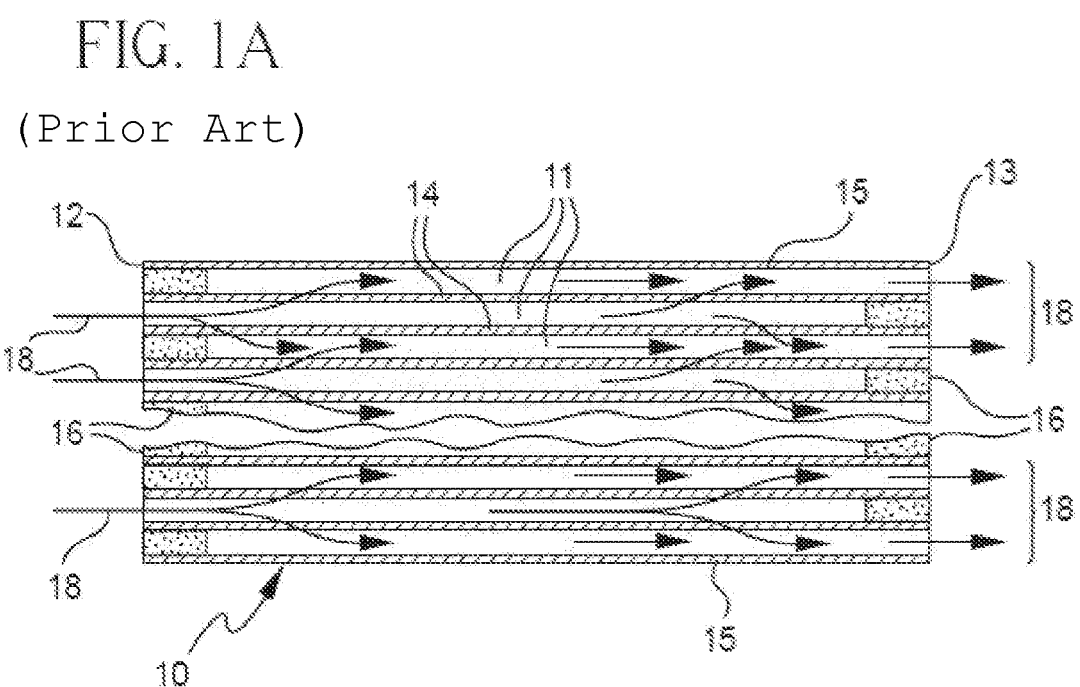

Referring now to the drawings, an exemplary solid particulate filter is shown in FIG. 1 and in a cross-sectioned view along line 1a-1a in FIG. 1a. The filter body comprises a honeycomb structure 10 having a multiplicity of hollow, open-ended passages or cells 11, which extend in a generally parallel fashion through the structure 10. The ends of the cells 11 are open at, and form a pair of substantially identical open outer surfaces, at the opposing end faces 12, 13 of the structure 10. The cells 11 are themselves formed by a matrix of intersecting walls 14 that extend between each of the end faces 12, 13. For filter body applications, the walls 14 are porous and continuous across the end faces 12, 13 and preferably uniformly thin, although walls of non-uniform thickness may be used also. An outer wall 15 (or skin) extends between the end faces 12, 13 bounding the cells 11 and thin walls 14.

The filter body may be formed from the honeycomb structure 10 by plugging, covering or otherwise blocking the open ends of a subset of cells at one end face 12 of the structure. Preferably, the remaining unblocked cells are plugged, covered or otherwise blocked at the remaining end face 13 of the structure. Selected cells are each plugged with a suitable plugging material, such as a sealant or cement mass, which extends from near the end faces 12, 13 a short distance into the cell 11, and is formed by passing the sealant or cement through, for example, a mask into the cell ends. After forming, the sealant or cement is cured by any method suitable for the particular material selected so as to form a seal that will substantially block the flow of the fluid being filtered. The result is an alternating pattern of plugs arranged on inlet end 12 and outlet end 13 so that exhaust flows through the porous walls of cells 11.

As seen in FIGS. 1 and 1a, alternate cells 11 of the honeycomb structure 10 have been blocked with plugs 16 at end faces 12, 13 preferably in a checked or checkerboard pattern. The plugging pattern on the end face 13 (hidden in FIG. 1) is the reverse of that depicted on the end face 12. The plugs 16 are selected from a material compatible with the composition of the honeycomb structure and its ultimate use as a filter body.

The honeycomb structure 10 may be formed of any cell (or channel) density, typically 100-350 cells per square inch. For the purpose of this application, the term "honeycomb" is intended to include materials having a generally honeycomb structure but is not strictly limited to a hexagonal structure. For example, hexagonal, octagonal, triangular, square, rectangular or any other suitable cell shape may be used.

Figure 5:
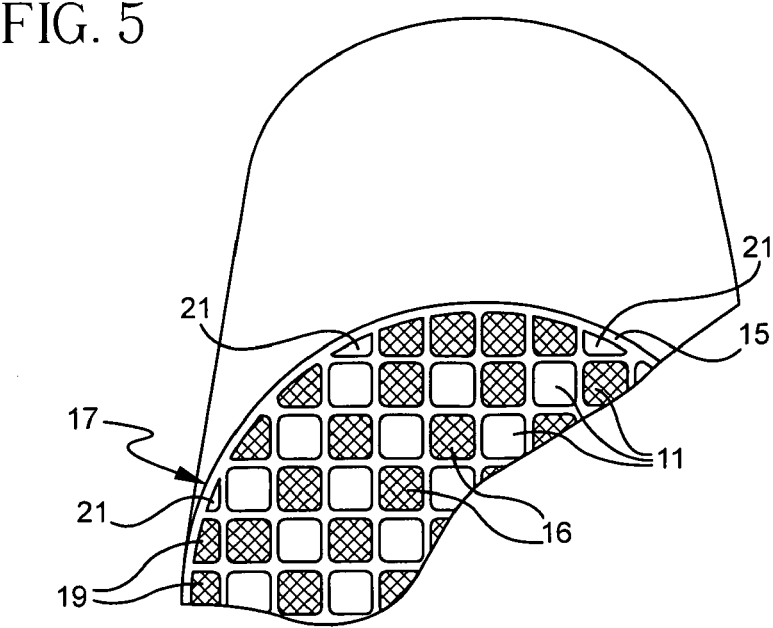
FIG. 5 illustrates a partial perspective view of a filter having unplugged partial peripheral cells.

The peripheral shape of the honeycomb structures themselves (as opposed to the shape of the cells of the honeycomb structure) may be any possible shape, for example, round, oval, and the like. A problem arises in that an integral number of complete cells do not fit into the cross-sectional area of the honeycomb structure and, instead, a row of partial cells occurs at the structure's perimeter. Automated plugging equipment used to plug alternating cells in filter bodies (as described above) have difficulty in finding and plugging these partial cells around the periphery. As seen in FIG. 1 and FIG. 5, the filter 10 includes a multitude of cells 11 some of which are plugged with plugs 16. The cells include an outermost row of cells 17 at the periphery, which includes partial cells 19 adjacent to and extending inwardly one row from the outer wall 15.

Figure 4:
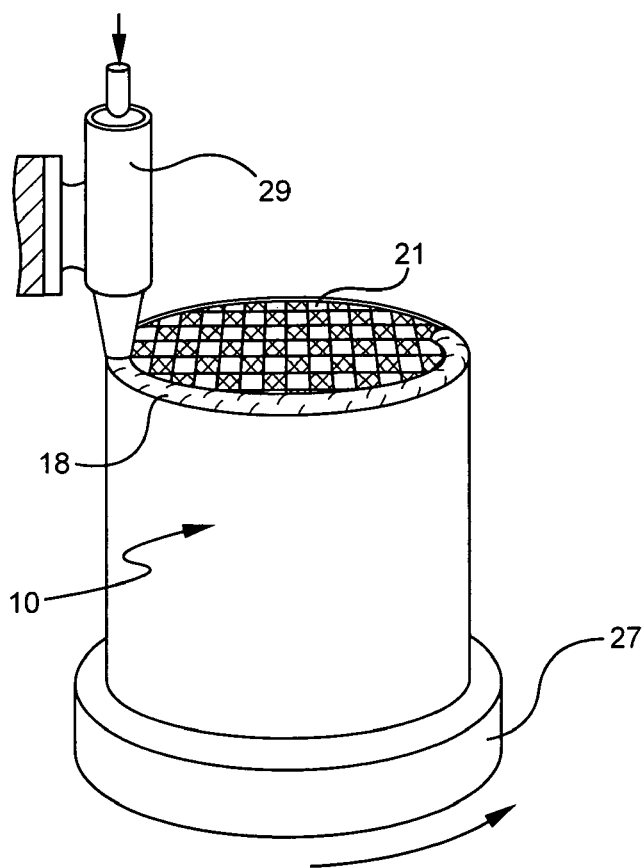
FIG. 4 illustrates a perspective view of an apparatus for applying a line of plugging material to block partial peripheral cells.
Figure 10:
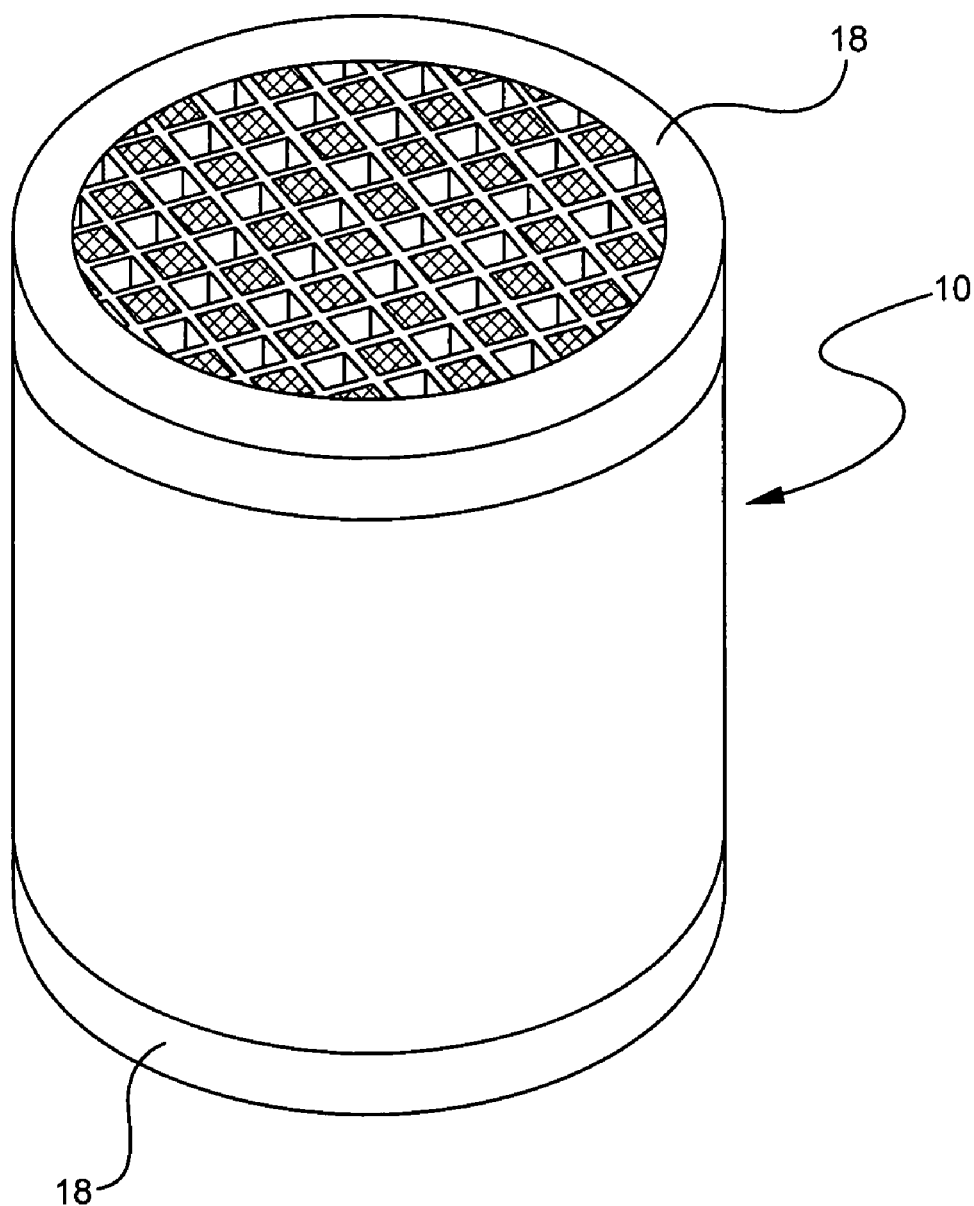
FIG. 10 illustrates a perspective view of a filter including a beveled edge having a line of plugging material applied thereto on both ends.
Figure 11:
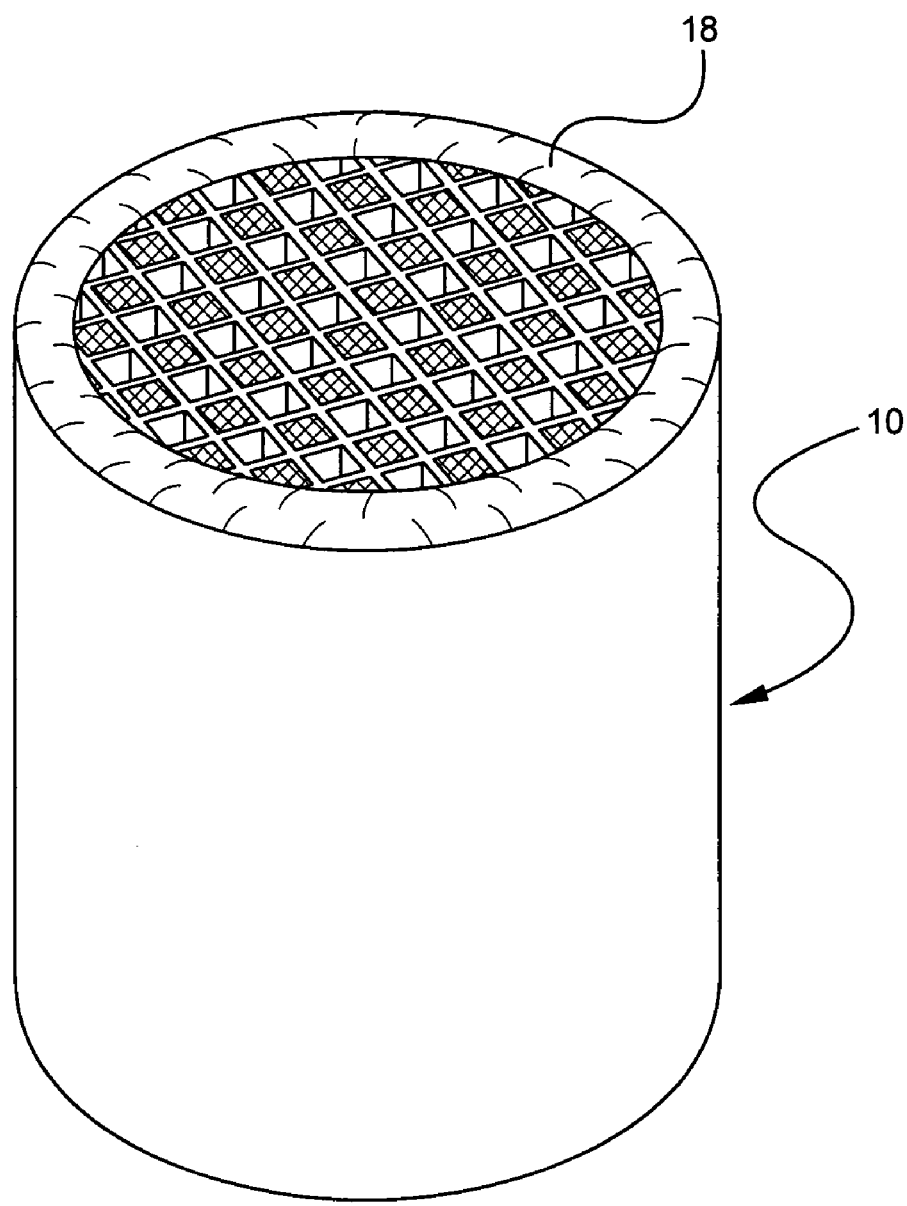
FIG. 11 illustrates a perspective view of a filter including a bead of plugging material applied thereto on an outlet end.

As discussed above, current plugging methods have difficulty in identifying and plugging certain cells around the periphery and some cells, especially small ones, such as those unplugged, partial cells 21 shown in FIG. 5. To overcome the problem of the unplugged, partial cells, the present invention blocks such partial cells. According to the present invention, the outermost row of cells 17 of one or both end faces is provided with a line of suitable plugging material atop them to block same. The line can be in the shape of a bead or have any number of cross-sectional shapes. The line of plugging material may extend between and block at least two partial cells around the periphery. However, the line may extend in an arcuate shape about the periphery of the filter as shown in FIG. 4, and may even extend substantially entirely around the periphery as shown in FIGS. 10 and 11. The plugging material is preferably a wet batch plugging material of substantially the same composition as the material forming the honeycomb structure; however, any suitable material having compatible physical and chemical properties could be utilized.

Figure 2:
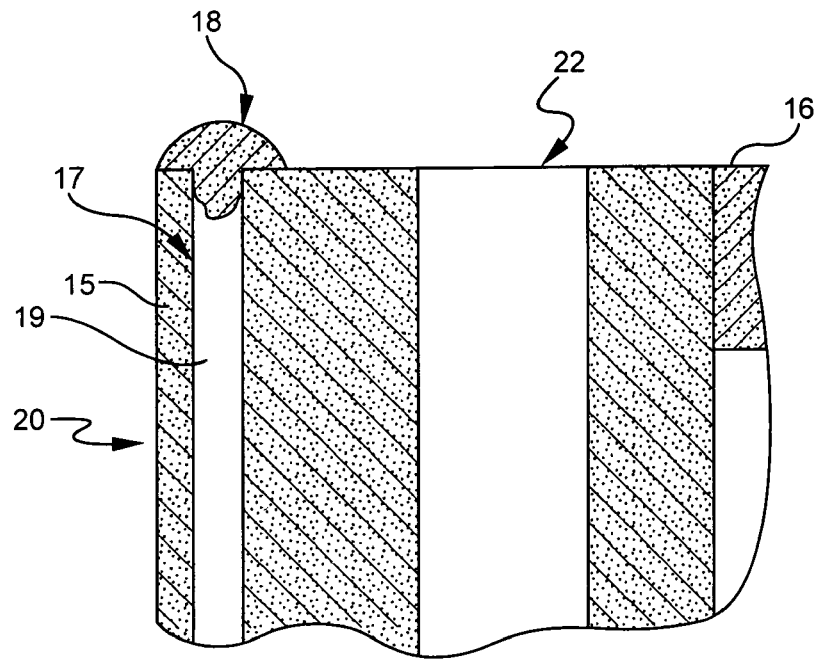
FIG. 2 illustrates a partial sectioned side view of one embodiment of the present invention in which a bead of plugging material is applied to one of the faces of the diesel filter atop the partial cell.
Figure 6:
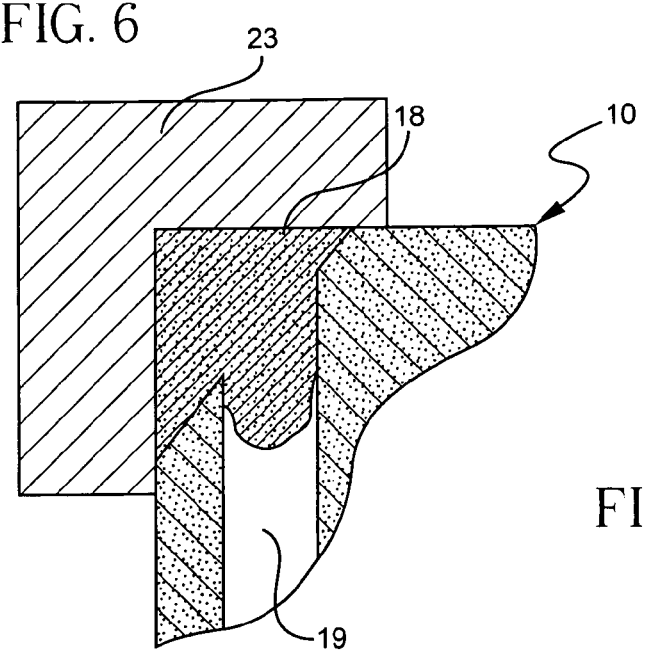
FIGS. 6-8 illustrate partial cross-sectional views of various filter embodiments including a beveled edge having a line of plugging material applied thereto.

The plugging material, preferably having substantially the same composition as the honeycomb structure, is supplied to, and applied over, the outermost row of cells 17 by either directly injecting the same or by applying a bead about the peripheral edge of one or both of opposed end faces 12, 13. The plugging material may be supplied at a pressure and viscosity such that the material flows part way into the partial cells as shown in FIG. 2. Optionally, the material may be pressed into such partial cells 19 to a desired depth. This pressing may be accomplished by a profile altering implement 23 such as the wiping tool shown in FIG. 6. The plugging material may be applied about the peripheral edge of the honeycomb structure 10 and pressed into the outermost row of cells as shown in FIG. 6, or it may be otherwise injected onto such partial cells. It has been found that for structures of the size normally utilized in vehicle emissions control, it is desirable to fill the partial cells of the structure to a depth of about 2 mm; however, it is understood that for larger structures a greater depth may be required.

According to one embodiment of the present invention, a line of a suitable plugging material, for example, sealant or plugging cement, may be applied to the outermost row of partial cells of the diesel filter 10. The line of plugging material may be added to either, or both, of the end faces of the diesel filter. In this embodiment, as best illustrated in FIG. 2, a bead 18 of plugging cement is applied to end face 22 of the diesel filter 20 along the outermost row of partial cells 17 adjacent to the outer wall 15 to block the partial cells 19 and prevent flow therethrough in operation. Most preferably, the plugging material of bead 18 is of the same composition as the plug material used to form the plugs 16. Preferably, the bead 18 is supplied by a metering head or applicator 25 in such a fashion that the partial cell 19 is not only blocked, but is also at least partially filled as shown in FIG. 2 and FIG. 4. The filter 10, after being plugged by the conventional plugging operation, is placed on a rotating turntable 27. A metering head 29 dispenses the line of plugging material in the form of a bead 18 onto the partial cells 19 which blocks any unplugged partial cells, such as unplugged cell 21 shown. The resulting filter with a line of plug material, i.e., a bead 18 blocking the peripheral partial cells is shown in FIG. 11. In this embodiment, the filter 10 is blocked only at the outlet end (shown) but includes conventional plugging on both ends.

Figure 3:
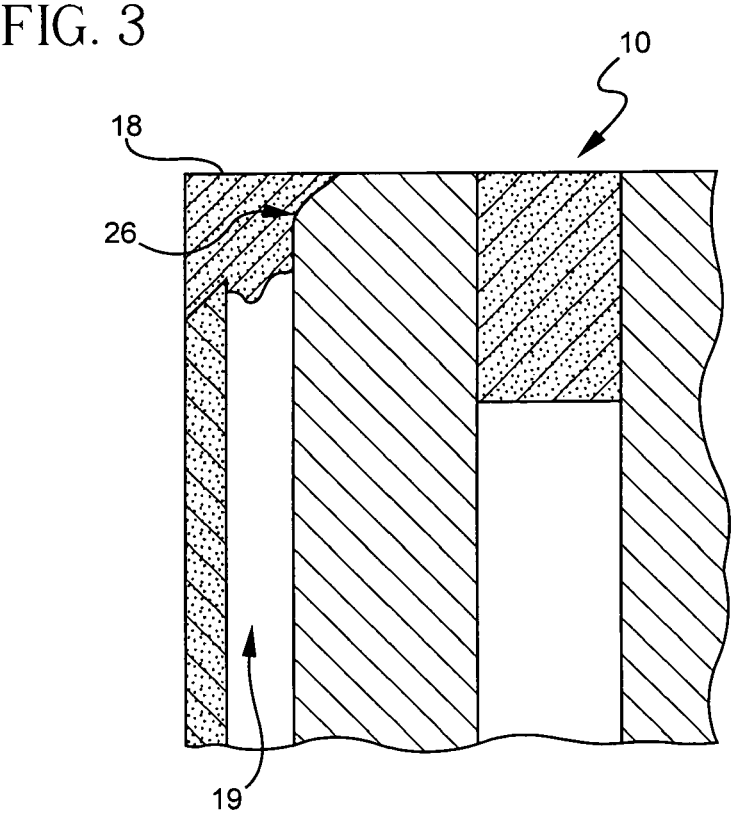
FIG. 3 illustrates a second embodiment of the present invention in which the outermost edge of the diesel filter is first beveled to form a beveled edge and uniquely off-set the partial cell and then the beveled edge has a plugging material applied to the beveled edge.
Figure 7:
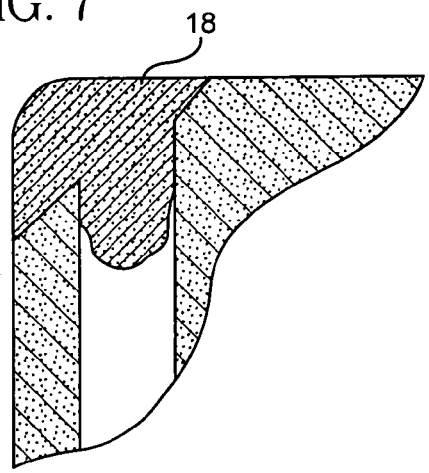
Figure 8:
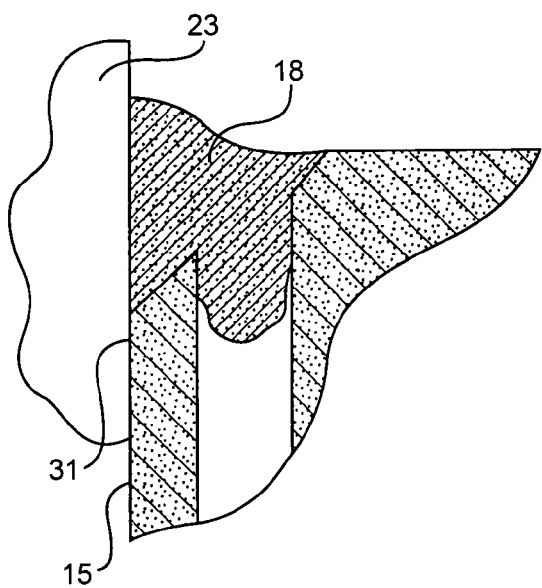
Figure 9:
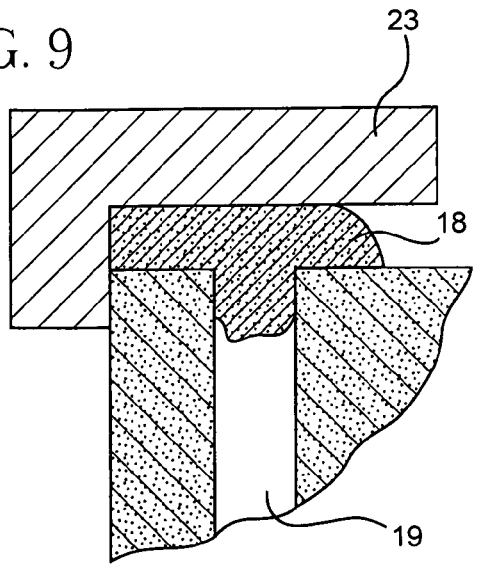
FIG. 9 illustrates a partial cross-sectional view of a filter embodiment including a bead of plugging material with a altered profile.

In another embodiment of the present invention as best shown in FIG. 3, the outermost edge (the outermost row of cells) of the diesel filter 10 is first beveled with, for example, a cutting or grinding tool, thereby leaving a substantially uniform beveled edge 26 about the outer periphery to which the plugging material may be applied. This beveling operation helps to uniquely off-set the partial cells 19 from the rest of the cells. A line of suitable plugging material 18 such as sealant or cement is then applied to the beveled edge 26. Optionally, the profile of the plugging material applied may be altered by a suitable implement 23 as described with reference to FIG. 6. For example, the profile may be altered to include the sharp edge the profile the filter had prior to the bevel being formed thereon. An embodiment of the filter 10 having the edge beveled and then having a line of plugging material applied to each end is shown in FIG. 10. Optionally, the corner profiles may include any of the shapes on the line of material 18 such. as shown in FIGS. 7-9. For example, the profile may be rounded as shown in FIG. 7 by including a rounded profile on an implement used to smooth the bead previously applied to the bevel. Optionally, only one surface 31 adjacent the outer surface 15 may be touched up with an implement 23 such as a doctor blade and shown in FIG. 8 to prevent the line of material from extending radially beyond the surface 15. Additionally, the implement 23 may be used to press a part of or all the bead 18 into the partial cells 19 as shown in FIG. 9. The edge-modified and plugged part can then be dried and second fired as is currently done with conventional, plugged-only filters. Optionally, the line of material may be applied in an overfill condition and then machined or ground to achieve the desired profile after firing.

These steps applying the line of plugging material according to the present invention are preferably performed after the diesel filter has first gone through a conventional masking and plugging operation and after the mask has been removed. In the embodiments described herein, the plug line of suitable plugging material blocks flow through the partially-formed cells such that in operation there is no longer any emission of unfiltered gas therethrough. An additional advantage of blocking the partial cells according to the present invention is that the edge of the diesel filter is strengthened and is, therefore, more resistant to chipping. A more chip resistant edge reduces handing losses in manufacturing plants, as well as the supply chain.

The foregoing description of the specific embodiments reveals the general nature of the invention that others can, by applying knowledge within the skill of the art, readily modify and/or adapt for various applications such specific embodiments, without undue experimentation and without departing from the general concept of the present invention. Such adaptations and modifications, therefore, are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method of manufacturing a honeycomb structure, comprising:
providing a honeycomb body having a multiplicity of cells extending therethrough between opposing end faces, said cells being defined by intersecting porous walls, and are bounded by an outer wall extending between said end faces, wherein said cells include a row of partial cells adjacent to said outer wall, and
applying to said partial cells a line of plugging material to block said row of partial cells.

2. The method of manufacturing of claim 1 wherein said plugging material is of a composition that is chemically compatible with and has substantially the same physical characteristics as a material of the honeycomb body.

3. The method of manufacturing of claim 1 wherein said plugging material is of substantially the same composition as the material of said honeycomb body.

4. The method of manufacturing of claim 1 wherein said line of plugging material comprises a bead of plugging material.

5. The method of manufacturing of claim 1 further comprising the step of flowing said line of plugging material into said partial cells.

6. The method of manufacturing of claim 1 wherein said plugging material is injected directly into said partial cells.

7. The method of manufacturing of claim 1 wherein said line of plugging material is injected onto a bevel formed on said honeycomb body.

8. The method of manufacturing of claim 1 wherein a beveled edge is formed over the row of partial cells adjacent to said outer wall.

9. The method of manufacturing of claim 8 wherein said line of plugging material is applied to the beveled edge.

10. The method of manufacturing of claim 1 further comprising heating said honeycomb body to dry and rigidify said plugging material.

11. A method of manufacturing a honeycomb structure, comprising:
providing a honeycomb body having partial cells at a periphery thereof;
forming a beveled edge atop said partial cells; and
applying to said beveled edge a plugging material, wherein said plugging material blocks said partial cells.

12. The method of manufacturing of claim 11 wherein said plugging material comprises a line of plugging material.

13. The method of manufacturing of claim 11 further comprising the step of pressing said plugging material into the beveled edge.

14. The method of manufacturing of claim 11 wherein said plugging material is injected directly onto the beveled edge.

15. The method of manufacturing of claim 11 wherein said plugging material comprises a line of plugging material and said partial cells are formed in a row at the periphery and said line of plugging material blocks said row.

16. The method of manufacturing of claim 11 wherein said plugging material comprises a bead extending around the periphery.

17. A honeycomb filter, comprising:
a honeycomb body having a multiplicity of cells extending therethrough formed from intersecting walls and an outer wall bounding said cells wherein the cells located adjacent to the outer wall comprise partial cells,
a bevel formed atop the partial cells, and
a line of plugging material applied to the bevel blocking the partial cells.

18. The honeycomb filter of claim 17 wherein the line of plugging material comprises a bead.

* * * * *